United States Patent [19]

Chibnik

[11] Patent Number: 4,621,141

[45] Date of Patent: Nov. 4, 1986

[54] ADDITIVES FOR IMPROVING LOW TEMPERATURE CHARACTERISTICS OF FUELS AND METHOD FOR USE THEREOF

[75] Inventor: Sheldon Chibnik, Cherry Hill, N.J.

[73] Assignee: Mobil Oil Corporation, New York, N.Y.

[21] Appl. No.: 604,189

[22] Filed: Apr. 26, 1984

[51] Int. Cl.$^4$ .................. C07D 241/04; C07D 239/72; A01M 23/10

[52] U.S. Cl. ........................................ 544/358; 44/63; 44/71; 44/77; 252/51.5 A; 260/404; 544/384; 544/386; 544/398; 546/290; 564/475

[58] Field of Search ............... 544/358, 398, 384, 386; 564/475; 546/290

[56] References Cited

U.S. PATENT DOCUMENTS

| | | | |
|---|---|---|---|
| 2,433,243 | 12/1947 | Smith et al. | 44/66 |
| 2,929,824 | 3/1960 | Kharasch et al. | 260/348 |
| 3,099,665 | 7/1963 | Emrick et al. | 260/410.6 |
| 3,129,699 | 4/1964 | Millikan | 123/1 |
| 3,272,712 | 9/1966 | Kalopissis | 167/87 |
| 3,281,438 | 10/1966 | Johnson | 260/404 |
| 3,294,499 | 12/1966 | Brook et al. | 44/63 |
| 3,342,840 | 9/1967 | Sobolev | 260/404 |
| 3,383,397 | 5/1968 | Milkis et al. | 260/404 |
| 3,468,640 | 9/1969 | Barusch et al. | 44/75 |
| 3,872,138 | 3/1975 | Ogata | 260/404 |
| 3,932,476 | 1/1976 | Bergeron | 260/404 |
| 3,957,854 | 5/1976 | Miller | 260/482 R |
| 3,962,104 | 6/1976 | Swietlik et al. | 252/32.7 |
| 4,017,522 | 4/1977 | Bailey et al. | 260/347 |
| 4,283,314 | 8/1981 | Zeilstra et al. | 260/23 |
| 4,295,861 | 10/1981 | Burns | 44/63 |
| 4,309,532 | 1/1982 | Cuscurida et al. | 544/398 |
| 4,451,265 | 5/1984 | Schwab | 44/51 |

FOREIGN PATENT DOCUMENTS 79200612  5/1980  European Pat. Off. .

*Primary Examiner*—Donald G. Daus
*Assistant Examiner*—Cecilia Shen
*Attorney, Agent, or Firm*—Alexander J. McKillop; Michael G. Gilman; Van D. Harrison, Jr.

[57] ABSTRACT

A telomeric acid, a tertiary amine, and an epoxide are reacted in the absence of added water. The product recovered is effective in improving the filterability and reducing the pour point of diesel fuel. Alternatively the product can be prepared by reacting a quaternary ammonium hydroxide and a telomeric acid.

4 Claims, No Drawings

ADDITIVES FOR IMPROVING LOW TEMPERATURE CHARACTERISTICS OF FUELS AND METHOD FOR USE THEREOF

NATURE OF THE INVENTION

This invention relates to additive compositions used to improve the filterability and reduce the pour point of diesel fuels.

PRIOR ART

As is well known to those skilled in the art, diesel fuels present problems at low winter temperatures because of poor flow characteristics and clogging of fuel filters.

The reference closest to the invention of which applicant is aware is U.S. Pat. No. 3,962,104. This patent discloses lubricating oil compositions containing minor amounts of quaternary ammonium salts useful as an oil improving additive. The quaternary ammonium salts utilize a cation derived from the reaction product of one molar proportion of a tertiary amine with one or more molar porportions of an olefin oxide and an amount of water in excess of stoichiometric. The anion is derived from an organic acid and the tertiary amine has substituents which are alkyl, cycloalkyl, alkenyl, cycloalkenyl, substituted alkyl, substituted alkenyl, aromatic or substituted aromatic groups, each having 1 to 20 carbon atoms.

European Patent Application No. 79200612.4, filed on Oct. 25, 1979, discloses derivatives of branched chain monocarboxylic acids. These are amides of ammonia, aliphatic or aromatic amines having at least 1 to 15 primary or secondary amino groups, or salts of alkali metals or alkylene earth metals. The anion is a branched chain monocarboxylic acid commonly known as a telomeric acid.

U.S. Pat. No. 4,283,314 discloses resin compositions having improved lubricating properties which employ branched chain high molecular weight ester derivatives of monocarboxylic acids. These monocarboxylic acids can be of the telomeric acid type.

One object of this invention is to provide a composition which will operate to lower the cloud point and the pour point of hydrocarbon fuels and lubricants.

SUMMARY OF THE INVENTION

Briefly stated, applicant has now discovered that the reaction product obtained by heating equivalent amounts of a tertiary amine, an epoxide, and a telomer acid results in a reaction product which will operate to reduce the pour point and cloud point of hydrocarbon fuels. Alternatively, the reaction product can be prepared by heating equivalent amounts of a quaternary ammonium hydroxide and a telomer acid. In another aspect, this invention constitutes a composition comprising a hydrocarbon fuel and the additive prepared according to the process of this invention. Other aspects of the invention will become apparent in the following disclosure.

DESCRIPTION OF THE INVENTION

The acid compounds utilized in this invention are telomer acids. These acids are described in European Patent Application No. 0 010 807 A1 and are available commercially (AKZONA, Inc., Asheville, N.C.). Telomer acids are also discussed in U.S. Pat. No. 4,283,314 to Zeilstra et al. Telomeric acids are obtained by the free radical addition of one mole of acetic anhydride to at least 3 moles of hexene and/or higher olefins containing up to 30 or more carbon atoms in the presence of a trivalent manganese compound. European patent application No. 0 018 807A1 filed Oct. 25, 1979 and U.S. Pat. No. 4,283,314 are incorporated herein by reference. A telomer acid ordinarily is one which has a branched chain structure and of which at least 10 percent by weight conforms to the formula

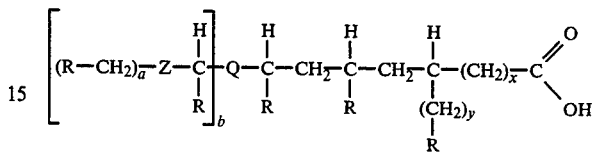

wherein
$x=0$, if $y=2$ or
$x=2$, if $y=0$
$R=CH_3(CH_2)_n$, where n represents a integer of from 3 to 42;
$b=0$ or 1, where
if $b=0$, Q represents a hydrogen atom, and
if $b=1$, Q represents a $CH_2$-group, and
$a=0$ or 1, where;
if $a=0$, Z represents a hydrogen atom, and
if $a=1$, Z represents a $CH_2$-group.

A preferred telomer is one made from $C_{11}$–$C_{14}$ olefins and is available commercially under the tradename Kortacid T-1401 through AKZONA, Inc. Asheville, N.C.

The epoxide ordinarily will be an oxide of the formula

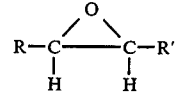

wherein the hydrocarbon substituents R and R' are at least methyl radicals and can be as large as twenty-two carbon atoms. Preferred epoxides are ethylene and propylene oxides. The tertiary amine can be one of the formula

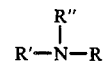

in which the substituents R, R' and R" range from 1 to 20 carbon atoms in size. In addition, amines such as pyridine and quinoline and substituted compounds thereof can be utilized as well as quaternary ammonium hydroxides. Preferred amines include dimethyldodecyl amine and pyridine. If amine hydroxides are used, then the epoxide is not included as a reactant.

The additive is made by heating equivalent moles of the tertiary amine, the epoxide, and the telomer acid as quaternary ammonium hydroxide and telomer acid. Ordinarily the amounts used will be in a 1:1:1 mole ratio of amine to epoxide to telomer acid or 1:1 ratio for hydroxide and acid. Reaction temperatures can vary from ambient (70° F.) to 300° F. Reaction times average from one to 16 hours or longer. The reaction is continued until the epoxide is consumed. The resulting product is a clear liquid which can be decanted to separate it from any other liquid phase or suspended solids.

In conducting this reaction it is important that no water be added to the reaction mixture at any time. If a liquid medium for the reactants is desirable than a non-reactant liquid medium such as heptane or diesel fuel can be used.

The resultant additive material is blended into the diesel fuel, etc. in which it is to be used to provide a concentration of between about 0.01 and about 5% by weight of mixture.

EXAMPLES

A number of reaction products were prepared according to the disclosure herein. These materials were prepared by reacting the reactants shown in Table 1 in equivalent molar proportions. The products were then blended in a 2½ weight percent ratio into diesel fuel and were tested for pour point (ASTM D-97) and filterability (IP 309/76). The control run was made to show the pour point and cloud point of the diesel fuel in the absence of any added material. Run 1 is an example showing the effect of using materials made with carboxylic acids other than the telomer acids. From these data it can be seen that the pour point and the cloud point of the diesel fuel is substantially reduced using the materials of this invention.

TABLE 1

| Run No. | Amine | Epoxide | Acid | Pour Point °F. | Cloud Point °F. |
|---|---|---|---|---|---|
| Control | — | — | — | −10 | −3 |
| 1 | DMC | PO | ND | −10 | −4 |
| 2 | DMC | PO | T1402 | −45 | −20 |
| 3 | DMP[(1)] | PO | T1402 | | |
| 4 | Py | PO | T1402 | −45 | −20 |
| 5 | DMC | EO | T1402 | | |
| 6 | TMED[(1)] | PO | T1402 | | |
| 7 | DMC | $C_{16}$ | T1402 | −45 | −34 |
| 8 | DMC | $C_{12}$ | T1402 | −45 | −14 |
| 9 | DMC | $C_{10}$ | T1402 | −45 | −18 |
| 10 | DMC | $C_{16}$ | T1001 | −45 | −8 |

[(1)]A diamine necessitates the use of 2 moles each propylene oxide and acid.
DMC = Dimethylcocoamine
DMP = N,N'—Dimethylpiperazine
Py = Pyridine
TMED = Tetramethylethylenediamine
PO = Propylene oxide
EO = Ethylene oxide
$C_{10}$, $C_{12}$, $C_{16}$ = decene, dodecene, hexadecene epoxide T1001, T1401 = Telomer acids, $C_{10}$ or $C_{14}$ side chain
ND = Neodecanoic acid

What is claimed is:

1. A composition prepared by reacting:
   (a) a telomeric acid, at least a portion of which has the structural formula

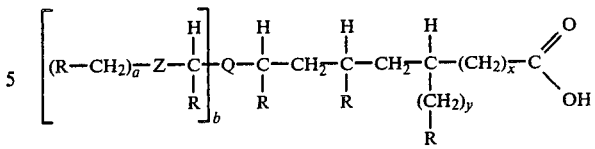

wherein
   $x=0$, if $y=2$ or
   $x=2$, if $y=0$
   $R=CH_3(CH_2)_n$, where n represents an integer of from 3 to 42;
   $b=0$ or 1, where
   if $b=0$, Q represents a hydrogen atom, and
   if $b=1$, Q represents a $CH_2$-group, and
   $a=0$ or 1, where;
   if $a=0$, Z represents a hydrogen atom, and
   if $a=1$, Z represents a $CH_2$-group;
   (b) an amine selected from the group consisting of pyridine, N,N'-dimethylpiperazine, and amines having the structural formula

where $R_1$, $R_2$ and $R_3$ are hydrocarbon groups of 1 to 20 carbon atoms each; and
   (c) an epoxide having the structural formula

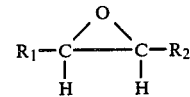

where $R_1$ and $R_2$ are each hydrogen or a hydrocarbon group having 1 to 22 carbon atoms each in the absence of added water, said reaction being conducted at a molar ratio of about one mole of telomeric acid and about one mole of tertiary amine each to one mole of epoxide, at a temperature between about 70° F. and about 300° F.

2. The composition of claim 1 wherein said telomeric acid has a side chain of 10 to 14 carbon atoms.

3. The composition of claim 1 wherein said amine is selected from the group consisting of N,N'-dimethylpiperazine.

4. The composition of claim 1 wherein said epoxide is selected from the group consisting of propylene oxide, ethylene oxide, decene epoxide, dodecene epoxide and hexadecene epoxide.

* * * * *

UNITED STATES PATENT AND TRADEMARK OFFICE
CERTIFICATE OF CORRECTION

PATENT NO. : 4,621,141

DATED : November 4, 1986

INVENTOR(S) : Sheldon Chibnik

It is certified that error appears in the above-identified patent and that said Letters Patent is hereby corrected as shown below:

Column 4, (Claim 3), line 3, after "N,N'-dimethylpiperazine", add --, and pyridine--.

Signed and Sealed this

Seventeenth Day of March, 1987

Attest:

DONALD J. QUIGG

Attesting Officer    Commissioner of Patents and Trademarks